July 21, 1959 H. J. SCHWERDHÖFER 2,895,576
AUTOMATICALLY ENGAGING AND DISENGAGING RATCHET
PAWL MECHANISM FOR CHANGEABLE SPEED
DRIVE COASTER BRAKES FOR BICYCLES
Filed Nov. 19, 1957 2 Sheets-Sheet 1
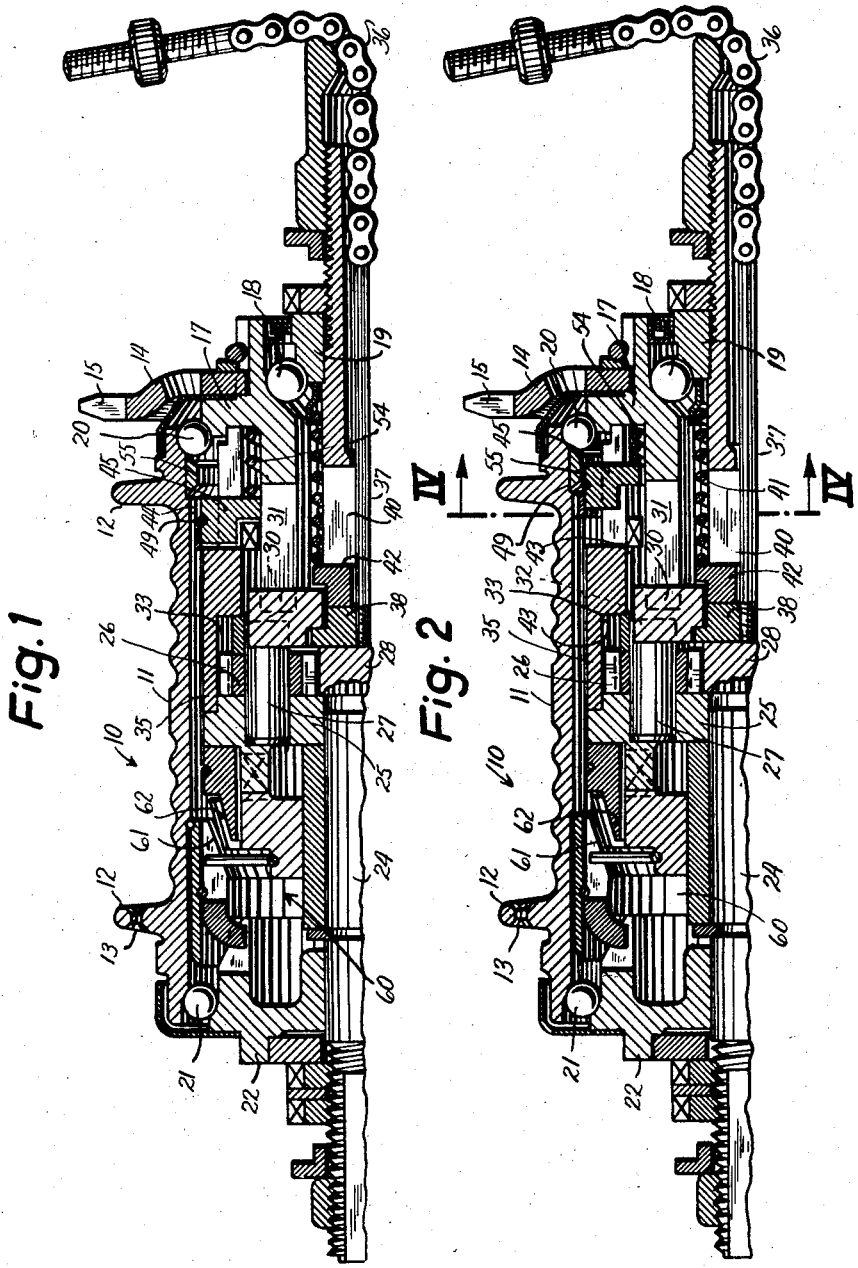
INVENTOR:
HANS JOACHIM SCHWERDHÖFER
BY
Richardson, David and Nardon
Arry's.

July 21, 1959   H. J. SCHWERDHÖFER   2,895,576
AUTOMATICALLY ENGAGING AND DISENGAGING RATCHET
PAWL MECHANISM FOR CHANGEABLE SPEED
DRIVE COASTER BRAKES FOR BICYCLES
Filed Nov. 19, 1957   2 Sheets-Sheet 2
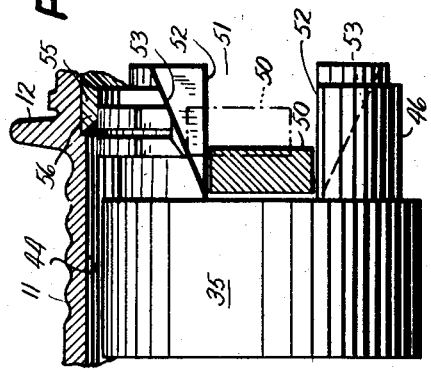
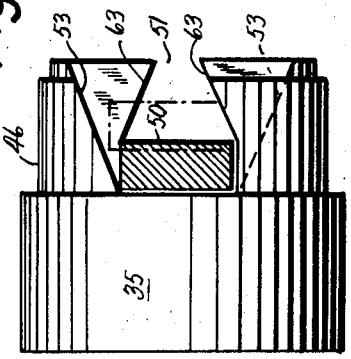
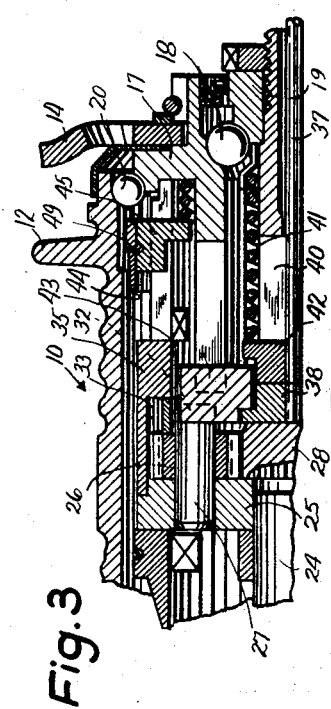
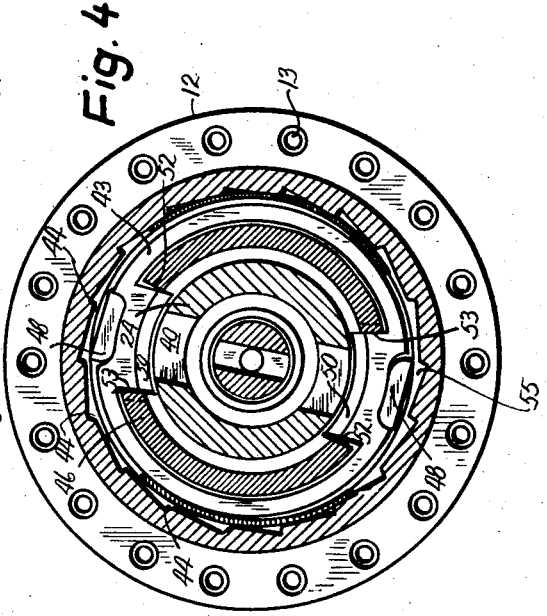
INVENTOR:
HANS JOACHIM SCHWERDHÖFER
BY
Richardson, David and Nordon
ATTYS.

United States Patent Office 2,895,576
Patented July 21, 1959

2,895,576

AUTOMATICALLY ENGAGING AND DISENGAGING RATCHET PAWL MECHANISM FOR CHANGEABLE SPEED DRIVE COASTER BRAKES FOR BICYCLES

Hans Joachim Schwerdhöfer, Schweinfurt (Main), Germany, assignor to Fichtel & Sachs A.G., Schweinfurt (Main), Germany, a corporation of Germany Application November 19, 1957, Serial No. 704,235

Claims priority, application Germany November 22, 1956

9 Claims. (Cl. 192—6)

The present invention relates to changeable gear ratio coaster brakes for bicycles and more particularly to automatically actuated means for engaging and disengaging the driving pawl mechanism of a coaster brake hub unit of the type which includes both a planetary gear shift mechanism and a reverse pedaling actuated coaster brake.

An example of a bicycle hub coaster brake and change speed gear transmission with which the present invention is suitable for use is shown, for example, in U.S. Patent No. 931,656, issued on August 17, 1909, to Charles T. B. Sangster. In this prior art coaster brake and planetary gear transmission, the drive pawls continuously ride over the ratchet teeth both in the free wheeling and back pedaling brake conditions with resultant wear on the ratchet teeth and an accompanying clicking noise. Moreover, it is possible with continuously engaged drive pawls, to lock the coaster brake in its braking position under certain circumstances.

An object of the invention is the provision of automatic drive pawl disconnecting means wherein the need for a separate pawl control member is avoided.

An advantage of the invention resides in its simplicity and low cost of manufacture.

The improvement of the invention includes the provision of an axially displaceable pawl carrier mounted for limited rotation relative to a drive member and a friction coupling between the pawl carrier and the wheel hub. The pawl carrier engages inclined surfaces of the drive member which produce axial movement of the pawl carrier to disengage its pawls from the cooperating teeth of the driven member when the pawl carrier is rotated forwardly or faster than the drive member by the action of the friction coupling.

In one embodiment of the invention, the pawls are urged back into engaging position by a spring. In another embodiment, separate inclined surfaces are provided for producing both the pawl engaging and pawl disengaging axial movements of the pawl carrier.

Various further objects, features and advantages of the invention will become apparent upon reading the following specification together with the accompanying drawing forming a part thereof.

Referring to the drawing:

Figure 1 is a view in axial section of a two speed gear ratio drive and coaster brake embodying the invention, the lower half of the view which is a duplicate of the upper half, being omitted for simplicity of illustration. In Figure 1, the pawl carrier is shown in its driving position.

Figure 2 is a view similar to Fig. 1, except that the pawl carrier is displaced towards the right with the drive pawls pressed inwardly so that they are disengaged from the cooperating ratchet teeth fixed to the hub wheel.

Figure 3 is a fragmentary view showing a modification in which the axial displacement of the pawl carrier is greater than that in Figs. 1 and 2, the pawls being disengaged by axial displacement beyond the ends of the ratchet teeth instead of being pressed inwardly.

Figure 4 is a transverse sectional view taken along the line IV—IV of Fig. 2, showing the drive pawls held pressed inwardly in their disengaged positions.

Figure 5 is a fragmentary view showing the ring gear drive member and the inclined surfaces thereon which produce rightward axial displacement of the pawl carrier to disengage the pawls, the pawls being reengaged by spring pressure urging the pawl carrier to the left.

Figure 6 is a fragmentary view similar to Fig. 5, the ring gear member being provided with two sets of sloping surfaces, one set causing pawl disengaging axial movement of the pawl carrier toward the right and the other set causing pawl reengaging movement thereof toward the left.

Referring to Figs. 1, 2 and 4, there is shown the hub 10 of a bicycle wheel comprising a central barrel portion 11 and end flanges 12 provided with apertures 13 for receiving and retaining the headed ends of the usual wheel spokes (not shown).

Disposed at the right side of the hub 10 is a sprocket wheel 14 provided with the usual teeth 15 adapted for engagement with the bicycle drive chain (not shown). The sprocket wheel 14 is rigidly connected to an intermediate member 17 which is freely revoluble on an inner series of balls 18 which engage a ball race formed on a stationary collar 19. The hub 10 and intermediate member 17 are revoluble with respect to each other by the provision of outer balls 20 which engages a ball race formed on the right hand end of the hub 10 and another race formed on intermediate member 17. At its left end, the hub 10 is freely revolubly supported by balls 21 which roll in a raceway formed on a fixed member 22.

The coaster brake assembly includes a fixed partially hollow axle 24 on the central portion of which there is a freely revolubly mounted planet gear carrier 25. There is a plurality of planetary gears 26, of which only a single gear is visible in the drawing, which are regularly arranged on the planet carrier 25. Each planetary gear 26 is freely revolubly mounted on a shaft 27 fixed to the planet carrier 25. All of the planetary gears 26 mesh continuously with a stationary sun gear the teeth of which are shown integrally formed with the fixed axle 24.

There is drive ring member 30 which is axially displaceable and which revolves freely with the intermediate member 17 so that the ring 30 is continuously connected for rotation in either direction with the sprocket wheel 14. The drive ring member 30 axially slidably engages leftwardly directed extensions 31 of the intermediate member 17. In the position shown in the drawing, the drive ring 30 engages the left hand ends of the planet gear shafts 27 which are received in recesses 32 formed in the drive ring member. The planet carrier 25 is thus connected for direct drive by the sprocket wheel 14.

The planet gears 26 also mesh continuously with internal teeth 33 formed on a ring gear drive member 35. When the planet carrier 25 is driven by the sprocket wheel 14, there is an overdrive connection from the sprocket wheel 14 to the ring gear drive member 35 so that the ring gear 35 turns at higher angular velocity than the sprocket wheel 14.

There is a gear shift control chain which may be connected to a suitable gear shift lever (not shown) arranged in conventional manner for convenient manipulation by the rider of the bicycle. The chain 36 is connected to the right hand end of a control rod 37 which is freely slidable axially in the hollow right hand portion of the axle 24. At its left hand end, the control rod 37 is threaded into an axially displaceable shouldered member 38 which projects outwardly through an axially extending slot 40 formed in the wall of the hollow portion of axle 24. The shouldered member 38 engages the drive ring 30 so that the drive ring 30 may be displaced toward the right from the position shown in the drawing by pulling on the control chain 36. The drive ring 30 is yieldingly urged toward the left by a helical compression spring 41 surrounding the hollow portion of the axle 24. The right hand end of spring 41 presses against a retaining ring which abuts the stationary collar 19. The left hand end of spring 41 presses against a slide member 42 disposed in the slot 40. The slide member 42, in turn, presses against the shouldered member 38 which provides for axial movement of the drive ring member 30. Thus, unless pulled toward the right by the control chain 36, the drive ring member 30 will engage the gear shafts 27 of the planet carrier 25 and drive the planet carrier 25 directly from the sprocket wheel 14. When displaced toward the right by the control chain 36, the drive ring 30 engages internal projections or teeth 43 in the ring gear member 35 and is simultaneously disengaged from driving connection with the planet carrier 25. Under these latter conditions, the ring gear member 35 is driven directly from the sprocket wheel 14 and the overdrive is cut out for climbing hills and the like. With the overdrive cut out, the planet carrier 25 revolves idly at reduced speed in the same direction as the sprocket wheel 14.

The internal surface of the hub barrel 11 is provided with axially elongated ratchet serrations or teeth 44 (Fig. 4). A circular pawl carrier 45 is axially displaceable on a longitudinally slotted hollow cylindrical extension 46 of the ring gear drive member 35. The pawl carrier 45 is provided with a plurality of outwardly spring pressed pawls 48 adapted for forward driving engagement with the ratchet teeth 44 of the hub barrel 11. At its periphery, the pawl carrier 45 carries a friction spring 49. The friction spring 49 is formed of spring wire of circular cross-section and couples the pawl carrier 45 with a limited maximum amount of torque to the internal surface of the hub barrel 11. When coast, or whenever the hub 10 turns faster than the ring gear member 35, the friction spring 49 imparts a forward torque to the pawl carrier 45.

The pawl carrier 45 is provided with inwardly projecting lugs 50 which engage in the longitudinal slots 51 of the ring gear extension 46. One side which is the rear side 52 of each slot 51, as shown in Fig. 5, is straight and extends parallel to the longitudinal axis of axle 24. The other, or forward side 53, of each slot 51 is sloping and is inclined forwardly and outwardly from the center of axle 24 at an acute angle with respect to the longitudinal axis of the axle 24. Except in the modified embodiment of Fig. 6, a helical compression spring 54, surrounding a part of the intermediate member 17, urges the pawl carrier 45 toward the left so that the pawls 48 normally engage the ratchet teeth 44.

There is an axially fixed internally projecting ring 55 at the right hand end of the hub 10 which is of smaller internal diameter than the circle defined by the tips of the ratchet teeth 44. At its left side the ring 55 is provided with a frusto-conical beveled surface 56 for pressing the pawls 48 inwardly out of engagement with the ratchet teeth 44 when the pawl carrier 45 moves toward the right into the position shown in Fig. 2.

When the hub 10 turns forwardly faster than the ring gear member 35, the outwardly spring pressed pawls 48 ride freely over the ratchet teeth 44. At the same time, a forward frictional torque is applied to the pawl carrier 45 by the friction spring 49, thus causing the lugs 50 to slide longitudinally forwardly and outwardly along the inclined edges 53 of the slots 51 in the cylindrical extension 46 of ring gear member 35. This forward torque, the magnitude of which is limited by slippage of the friction spring 49, causes the pawl carrier 45 with its pawls 48 to move toward the right from the position shown in Fig. 1 where the pawls are engaged to the position shown in Figs. 2 and 4 in which the pawls are disengaged. As shown in Fig. 5, the lugs 50 move toward the right in the slots 51 from the position indicated in solid lines to position indicated in dot-dash lines. As the pawls move toward the right, their tips ride up on the frusto-conical edge 56 of the internal ring 55 so that they are held out of engagement with the ratchet serrations 44. In this manner the pawls 48 are automatically disengaged from the ratchet teeth 44 during coasting and the usual annoying clicking sound is avoided.

In the left hand portion of the hub 10, the planet carrier 25 is connected to back-pedaling brake mechanism designated generally as 60 which may take any desired conventional form and which will not be described in detail. When back-pedaling, the planet carrier 25 will turn backwardly along with the sprocket wheel 14. With the drive ring 30 positioned as shown in the drawing so that the overdrive is in operation, the planet carrier 25 will turn backwardly directly with the sprocket wheel 14. With the drive ring 30 displaced toward the right so that the overdrive is cut out, there will be a gear reduction effect between the sprocket wheel 14 and the planet carrier 25 so that a greater back-pedaling torque is applied to the planet carrier 25 than is applied to the sprocket wheel 14. This is because the sprocket wheel 14 is then connected directly to the ring gear member 35, so that the planet gears 26 then impart an increased back-pedaling braking torque to the planet carrier 25.

The braking mechanism 60 comprises cooperating clutch members 61 and 62 which engage each other upon reverse rotation of the planet carrier 25, one clutch member 61 being arranged to actuate the brake elements and the other clutch member 62 being connected to the planet carrier 25 for rotation therewith.

Figure 3 shows a modified embodiment of the invention in which the internal ring 55 with its frusto-conical sloping surface 56 is omitted. In the embodiment of Fig. 3, the travel of the pawl carrier toward the right, when coasting, is increased with respect to the embodiment of Figs. 1 and 2 so that the pawls 48 move axially through a distance sufficient to clear the right hand edges of the ratchet teeth 44. In this manner, the pawls 48 are freed from engagement with the ratchet teeth 44 whenever the hub 10 forwardly overtravels the ring gear member 35 and pawl carrier 45. The embodiment of Fig. 3 is otherwise the same as that shown in Figs. 1 and 2.

Fig. 6 shows another modified embodiment wherein the helical compression spring 41 is omitted. To retract the pawl carrier 45 toward the left for forward drive, the rear edges of the slots 51 are modified as indicated at 63 so that the backward torque applied to the pawl carrier 45 as it attempts to travel forwardly faster than the hub 10 urges the pawl carrier 45 toward the left, thereby bringing the pawls 48 back into engagement with the ratchet teeth 44.

In all of the embodiments, when coasting or when back pedaling, the pawls 48 are disengaged from the ratchet teeth 44. In this manner, if the back pedaling brake is applied, the pawls 48 are always clear of the ratchet teeth 44 permitting the coaster brake 60 to release itself at all times without any interference by the pawls 48. Otherwise, if the pawls were not disengaged, the brake could be applied with maximum braking force just as one of the pawls 48 becomes engaged behind one of the ratchet teeth 44, thus locking the brake applied with maximum braking force. Under such circumstances, further back pedaling to release the brake is not possible because the brake is already applied to its maximum extent. Under such circumstances, the brake 60 cannot be released when thus locked without disassembling the braking mechanism. The present invention avoids the possibility of thus locking the brake 60.

While I have shown what I believe to be the best embodiments of my invention, it will be apparent to those skilled in the art that various changes and modifications may be made therein without departing from the spirit and scope of the invention as defined in the appended claims.

What is claimed is:

1. In a changeable speed coaster brake device of the type which comprises a sprocket wheel adapted for engagement with the drive chain of a bicycle, a wheel hub adapted for support by the wheel spokes of said bicycle, an axle on which said sprocket and hub are both freely rotatable, a driving member rotatable on said axle, changeable ratio gearing connecting said sprocket wheel to said driving member, means for changing the gear ratio of said gearing, and back pedaling brake means connected to said driving member for braking said hub in response to backward rotation of said driving member, the improvement which comprises the provision of mutually axially displaceable pawl and ratchet means for connecting said driving member to said hub for forward driving of said hub by said sprocket through said gearing, limited torque friction means continuously interconnecting said hub and said pawl and ratchet means, and means defining a guide surface inclined with respect to the axis of said axle, said guide surface causing pawl disengaging axial displacement of said pawl and ratchet means to disengage the same when said hub rotates forwardly faster than said driving member.

2. In a changeable speed coaster brake comprising a hub adapted to be supported by the rear wheel spokes of a bicycle, a sprocket adapted for rotation selectively forwardly or backwardly by the drive chain of said bicycle, a fixed axle on which said hub and said sprocket are both separately freely revolubly coaxially mounted, a drive member coaxially rotatable with respect to said axle, change speed gearing connecting said sprocket to said drive member, an axially displaceable pawl carrier connected to said drive member for rotation therewith, ratchet teeth fixed to said hub for driving said hub forwardly, at least one pawl carried by said pawl carrier and engageable with said ratchet teeth in a first predetermined axial position of said pawl carrier for forward driving of said hub, said pawl becoming disengaged from said teeth upon axial displacement of said carrier to a second position spaced from said first position, means responsive to relative rotation between said carrier and said drive member for displacing said carrier from said first position to said second position when said carrier is rotated forwardly with respect to said drive member, torque limiting coupling means connecting said hub to said carrier, return means for displacing said carrier from said second to said first position in the absence of said forward rotation of said carrier with respect to said drive member, and back pedaling brake means for braking said hub in response to rearward rotation of said drive member.

3. A changeable speed coaster brake according to claim 2, in which said drive member has a longitudinally slotted cylindrical extension on which said pawl carrier is mounted, said pawl carrier comprising a portion disposed for longitudinal movement in said slot, and wherein said means responsive to relative rotation comprises an inclined surface formed on the forward edge of said slot of said cylindrical extension, said surface being inclined with respect to the longitudinal axis of said axle.

4. A changeable speed coaster brake according to claim 3, in which said return means comprises resilient means yieldingly urging said pawl carrier toward said first position.

5. A changeable speed coaster brake according to claim 3, in which said return means comprises an inclined surface formed on the rearwardly disposed edge of said slot of said cylindrical member, said surface being inclined with respect to the axis of said axle.

6. A changeable speed coaster brake according to claim 2, wherein said torque limiting coupling means comprises a friction spring carried by said pawl carrier and continuously engaging said hub.

7. A changeable speed coaster brake according to claim 2, further comprising an internal ring member axially fixed with respect to said hub, the internal surface of said ring member being engaged by said pawl in said second position of said carrier and not in said first position thereof, said ring member having an internal diameter smaller than the circle defined by the tips of said ratchet teeth.

8. A changeable speed coaster brake according to claim 7, wherein said ring member has a frusto-conical surface upon which said pawl rides in the course of movement of said carrier from said first position to said second position.

9. A changeable speed coaster brake according to claim 2, wherein said ratchet teeth extend axially of said hub for a limited distance such that when said pawl carrier is moved from said first to said second position, said pawl moves beyond the ends of said ratchet teeth.

References Cited in the file of this patent

UNITED STATES PATENTS 2,799,183    Rhein et al. _____ July 16, 1957